Figure 1:
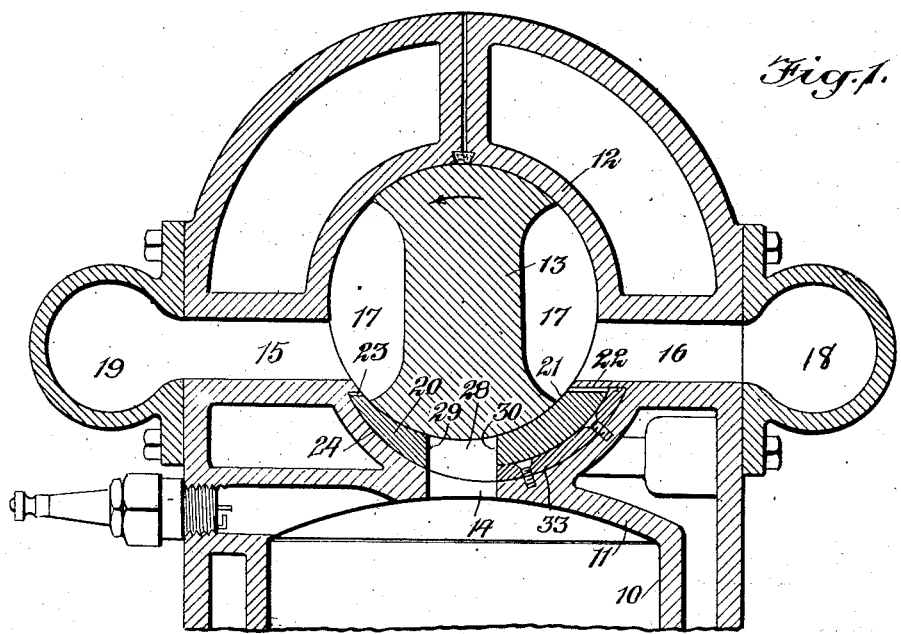

March 17, 1925

R. WEHR

ROTARY VALVE FOR INTERNAL COMBUSTION ENGINES

Filed Dec. 28, 1922

1,529,975

Inventor
Rudolph Wehr
By his Attorneys
Dean, Fairbank, Obright & Hirsch

Patented Mar. 17, 1925.

1,529,975

UNITED STATES PATENT OFFICE.

RUDOLPH WEHR, OF NEW YORK, N. Y., ASSIGNOR TO WEHR MOTOR COMPANY, INC.

ROTARY VALVE FOR INTERNAL-COMBUSTION ENGINES.

Application filed December 28, 1922. Serial No. 609,386.

*To all whom it may concern:*

Be it known that I, RUDOLPH WEHR, a citizen of the United States, and resident of New York, in the county of New York and State of New York, have invented certain new and useful Improvements in Rotary Valves for Internal-Combustion Engines, of which the following is a specification.

This invention is an improvement in rotary valves, and relates to the means for maintaining the parts in proper working contact to prevent leakage but permit easy movement under varying conditions of temperature, wear, lubrication, speed of rotation, and pressure of the controlled fluid.

My invention is adapted for use in controlling various fluids and in a wide variety of apparatus or systems where continuous or intermittent rotation in one direction only is desired or permissible, but in its preferred embodiment it is designed primarily for use in controlling the port or ports of an internal combustion engine where the temperature varies through a wide range, the pressure of the controlled gas fluctuates rapidly, and proper lubrication is often difficult.

My invention is an improvement on the construction disclosed and broadly claimed in my prior Patent No. 1,347,978, issued June 27th, 1920. In the specific form illustrated in said patent, there is provided a curved wedge-shaped member within or as a part of the valve casing, and movable circumferentially of the valve through a limited distance to increase or decrease the clearance between the valve and the casing, and maintain proper working fit under all conditions of operation.

The wedge member, as shown in the patent, is disposed at the side of the valve toward the end of the cylinder so that the upward pressure of the gas through the port against the valve tends to hold the valve against the far side of the casing, thus relieving the wedge member of this pressure and permitting it to move freely to the proper position under the action of the opposing controlling forces. These forces include the friction of the valve tending to move the wedge toward its base to increase the clearance, one or more springs or other yielding means tending to move the wedge in the opposite direction, and the pressure of the gas. The tendency toward leakage is greatest when the fluid pressure is highest, and in an internal combustion engine this is at or immediately following the ignition of the charge.

The main object of my invention is to so design the parts that as the fluid pressure controlled by the valve increases, there is a corresponding increase in the force brought to bear in holding the wedge member in such position as to best resist or prevent leakage.

A further object of the invention is to provide an improved means whereby the pressure of the gas in the cylinder is employed for holding the wedge member in position to prevent leakage, and a further object is to prevent the high pressure gas at the instant of explosion from so acting on the movable parts as to produce increased clearance and corresponding leakage.

In the form and general arrangement illustrated in my prior patent above referred to, the engine port extends through the wedge member and the wall of the port is thicker at the side of the port nearer the base than at the side nearer the thinner edge of the wedge. By reason of this difference in area, the gas pressure tends to move the wedge toward the larger edge of its space and give increased clearance at the time when minimum clearance is most important. The springs are therefore adjusted to neutralize both this pressure effect and the friction or drag effect of the valve.

In my present invention I so design the wedge member and coacting parts that the pressure of the gas on the wedge member is better controlled. It may be made equal in opposite directions so that the gas pressure exerts no tendency towards moving the wedge member in either direction, or the direction of the application of the net effect which the gas pressure exerts may be such that it acts with, rather than against, the spring to move the wedge member toward the thinner part of its chamber or space, and give a tighter fit. In other words, I either negative the effect of the gas pressure or utilize it to produce the greatest leak resisting force when the gas pressure is highest.

In the preferred embodiment this is accomplished in a very simple manner by making the walls of the port of equal thickness upon opposite sides, or making the side of the port toward the narrow edge of the wedge member of greater thickness than the side nearest the base of the wedge member. Any desired ratio of surface areas at opposite sides of the port may be accomplished by providing grooves from the port to or toward the base end of the wedge in the outer surface of the latter, and filling these grooves by flanges or projecting parts on the stationary wall of the valve casing. By varying the depth of the grooves the thickness of the wall surface at one side of the port may be varied at will in respect to the thickness of the wall surface at the other side of the port. Thus gas pressure may be exerted against the wedge member in either direction, or may be rendered equal in opposite directions, and therefore of no effect.

Figure 2:
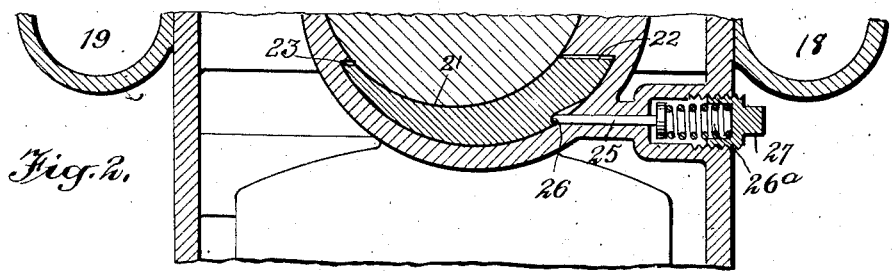
Figure 3:
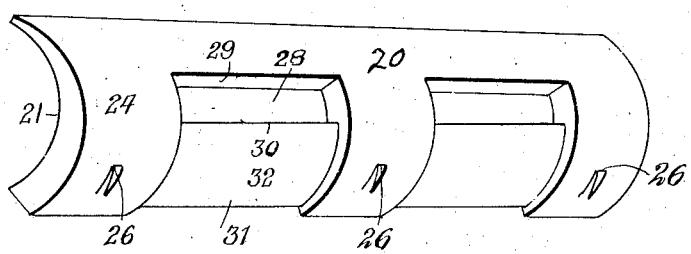

In the accompanying drawings there is illustrated one embodiment of my invention. In these drawings:

Fig. 1 is a transverse section through the cylinder head, valve and valve casing of an internal combustion engine, the section being taken through a cylinder port, Fig. 2 is a section similar to a portion of Fig. 1, but taken in a plane between adjacent ports, and Fig. 3 is a perspective view of a wedge member adapted for use with two cylinders or engine ports.

In the construction illustrated the engine cylinder 10 is provided with a head 11 cooperating with a cap or casing member 12 to form a casing for a rotary valve 13. The cylinder head has a port 14 and the valve is so constructed as to establish communication between this port and either an exhaust port 15 or an inlet port 16. The valve is provided with passages 17 and means (not illustrated) for rotating the valve in a counter clockwise direction so that a passage 17 will connect the passages 14 and 15 to permit the escape of exhaust gas from the cylinder, and will thereafter establish communication between the port 14 and the port 16 to permit the intake of the next charge. The valve if provided with two passages 17 is rotated so as to make one half revolution for each four-stroke cycle of the engine if the latter be of the four cycle type. The intake and exhaust ports may be provided with suitable manifolds 18 and 19 for supplying the charge and receiving the exhaust.

The valve casing is so formed that between the valve and the casing there is inserted a curved wedge member 20. This extends lengthwise of the valve and may be of the proper length for one or any desired number of cylinders. As illustrated in Fig. 3 it is adapted for a block of two cylinders. The inner surface 21 of this wedge member is substantially coaxial with the valve, although there may be a slight difference in curvature and a slight difference between the radii of the valve chamber and the valve casing to permit the expansion of the valve when the latter becomes highly heated. The wedge member has a thicker or base edge 22 and a thinner edge 23 which extend lengthwise of the valve. The main portion of the outer surface 24 is in the arc of a circle but having a larger radius than the arc of the inner surface 21 and eccentrically disposed. The wedge member may extend along any desired fraction or portion of the periphery of the valve, and the eccentricity may be such as to give the desired difference in width or thickness of the opposite edges of the wedge member. It will be apparent that by moving the wedge member toward its narrower edge, that is, against the direction of rotation of the valve, the clearance of the valve will be reduced, and a tighter fit secured, while if the wedge member be moved in the opposite direction the clearance will be increased to permit freer movement of the valve. The wedge member is so disposed that the frictional engagement of the valve will tend to move it so as to give increased clearance. Any suitable yielding means may be employed for counteracting these influences, and tending to move the wedge member so as to give reduced clearance. As illustrated, there are provided a plurality of plungers 25 acting substantially tangentially against the wedge member, as for instance into pockets or shoulders 26 in the outer surface of the wedge member. Each plunger has a head portion against which acts a spring 26$^a$, and the tension of the springs may be adjusted by threaded caps or plugs 27 engaging with the outer ends of the springs.

The parts above referred to, when considered per se, form no novel portion of the present invention, and if desired, may be substantially as illustrated in my prior Patent 1,347,978 above referred to.

The wedge member 20 is provided with a port 28 substantially registering with or forming an extension of the cylinder port 14. With the wedge member constructed as shown in said patent, it will be apparent that the surface of the wedge member which is exposed within the port and which is nearer to the thinner edge, will be of less area than the opposite surface which is nearer to the base or thicker edge. Thus, high pressure in the cylinder and within the port will tend to move the wedge member toward the base or thicker edge of the wedge member and along the surface of the valve in the direction of rotation of the latter and against the action of the springs 26. When the pressure is the highest and the need for a gas-tight engagement with the valve in the valve casing is most necessary, there will be the greatest tendency toward moving the wedge member and permitting leakage. By means of my present invention I entirely overcome this tendency and may thus use very much smaller and weaker springs 26.

In carrying out my present invention I so design and construct the parts that the gas pressure in the cylinder may be employed to create a net pressure effect in either direction on the wedge member, or may be neutralized by acting equally in opposite directions. In the preferred construction I accomplish this by providing grooves 31 in the outer surface of the wedge member and extending from the port to or toward the base edge of the wedge and fill these grooves at least at the end exposed at the port 28 by ridges, flanges or projections on the opposed surface of the valve casing. Preferably the ports 28 are substantially rectangular and each groove 31 is of uniform depth throughout its length, and of a width substantially equal to the width of the port. Thus the surface 32 forming the bottom of the groove is parallel to the outer surface 24 of the body of the wedge member, and in an arc of a smaller radius but with the same center. The grooves are filled by curved plates 33 of the same width and depth as the groove and of uniform thickness and secured to the inner surface of the stationary part of the valve casing in any suitable manner. The thickness of these plates and the corresponding depth of the grooves may be made of any desired dimension in respect to the thickness of the wedge member and its eccentricity. By proper proportioning of the size and depth of the groove and the corresponding size and height of the projections or plates 33, the exposed surface 30 of the port 28, and which is nearer to the base of the wedge member, may be made of any desired area in respect to the area of the opposite exposed surface 29 which is nearer to the thinner edge of the wedge member. By making these two surfaces exactly equal, it will be noted that the gas pressure in the cylinder will not tend to move the wedge member in either direction. By making the surface 30 slightly less than the surface 29, there will be an excess effective pressure on the surface 29, and thus the gas pressure will continually tend to move the wedge member so as to give reduced clearance and better fit. This is important as at the instant of the highest pressure, namely at or immediately following the ignition, it is most important that leakage be prevented, and it is at this instant that the gas pressure acts to force the wedge into tight fitting position. It will be noted that if the surface 29 is greater than the surface 30 the gas pressure will act with the springs 26 and against the friction between the valve and the inner surface 21 of the wedge member.

By means of my improved construction the proper running fit for the valve will be maintained at all times and under wide variations of temperature, engine speed, gas pressure, and lubrication. If the lubrication fails the friction between the valve and the wedge will increase and the wedge will be moved toward the base end to give the necessary increased clearance and reduction in friction. The wedge member will take one position when the engine is cold and will be forced back against the springs 26 to a different position when the valve is hot and has expanded. It will of course be evident that in order to secure the desired ratio of surfaces 29 and 30, the groove 31 may be made narrower and deeper, or may be replaced by a plurality of narrower and deeper grooves or by other proportioning and design. It is not essential that the groove extend all of the way to the base end of the wedge as it is only essential that it extend far enough back from the port 28 to permit of the mounting of a plate, ridge or other projection 33. The range of movement of the wedge member will ordinarily be comparatively slight, and will of course depend upon the amount to which the valve itself may change in diameter with changes in temperature, etc., and will depend upon the eccentricity of the outer surface 24 in respect to the inner surface 21. The stabilizing of the wedge member so far as pressure is concerned, or the application of pressure to give reduced clearance is accomplished by the proportioning of the areas against which the gas pressure may act. In the form illustrated these areas are only the areas exposed within the port 28, although it will of course be evident that by forming proper passages in the cylinder head the gas pressure might be brought to bear against an additional surface of the wedge member so as to give the desired effect, and in the desired direction.

Having thus described my invention, what I claim as new and desire to secure by Letters Patent is:

1. The combination with a rotary valve and its valve casing of a wedge member having one surface engaging with the valve and movable through a limited distance in respect to the casing, and means whereby an increase in pressure of the fluid controlled by the valve exerts a tendency to move the wedge member to reduce the clearance of the valve.

2. The combination with a rotary valve and its valve casing of a curved wedge member having one surface engaging with the valve and movable circumferentially through a limited distance in respect to the casing, and means whereby the increase in pressure of the fluid controlled by the valve exerts a tendency to move the wedge member to reduce the clearance of the valve.

3. The combination with a rotary valve mounted for one-way rotation only, and a valve casing therefor, of a curved wedge member having one surface engaging with the valve and movable circumferentially through a limited distance in respect to the casing, and means whereby the pressure of the fluid controlled by the valve exerts a tendency to move the wedge member in a direction opposite to that of the direction of travel of the adjacent valve surface.

4. In combination a valve casing, a valve mounted therein for one-way rotation only, said casing having a movable section presenting an inner surface contacting with the valve and an outer surface eccentric to the surface of the valve, the direction of rotation of the valve being such that friction with said section tends to move the latter in one direction, and means whereby the pressure of the fluid controlled by said valve tends to move said section in the opposite direction.

5. In combination, a valve casing, a rotary valve mounted for one-way rotation, a curved wedge member having its inner surface concentric with said valve and its outer surface eccentric thereto, the direction of rotation of the valve being such that friction tends to move said wedge member in one direction to increase clearance, resilient means tending to move said wedge member in the opposite direction, and means for applying the pressure of the fluid controlled by the valve to said wedge member in such a manner as to tend to move the latter in the last mentioned direction.

6. In combination a valve casing, a rotary valve mounted for one-way rotation, a curved wedge member having its inner surface concentric with said valve and its outer surface eccentric thereto, the direction of rotation of the valve being such that friction tends to move said wedge member in one direction to increase clearance, resilient means tending to move said wedge member in the opposite direction, said member having a port therethrough, and means for controlling the application of fluid pressure to said wedge.

7. In combination a valve casing, a rotary valve mounted for one-way rotation, a curved wedge member having its inner surface concentric with said valve and its outer surface eccentric thereto, the direction of rotation of the valve being such that friction tends to move said wedge member in one direction to increase clearance, resilient means tending to move said wedge member in the opposite direction, said member having a port therethrough, and means for controlling the application of fluid pressure to said wedge so that said fluid pressure acts with and in the same direction as said resilient means.

8. In combination a valve casing, a rotary valve mounted therein for one-way rotation only, a curved wedge member having its inner surface substantially concentric with the valve and its outer surface eccentric, said wedge member extending circumferentially of the valve, the direction of rotation of the valve being such that friction tends to move the wedge in a direction to give increased clearance, said wedge member having a port therethrough and means for controlling the application of fluid presure to said wedge so as to tend to move the wedge in the opposite direction.

9. In combination a valve casing, a rotary valve therein, a curved wedge member between said casing and said valve, resilient means tending to move said wedge member in one direction, and means whereby the net effect of the action of the fluid pressure controlled by said valve on said wedge member is in the same direction as the action of said resilient means.

10. In combination a valve casing, a rotary valve, a wedge member movable to vary the clearance of the valve in the valve casing, said wedge member having a port therethrough and a portion of the outer surface at one side of said port cut away to control the action of fluid pressure on the wedge member.

11. In combination a rotary valve, a valve casing therefor, a curved wedge member having the inner surface engaging with the valve and the outer surface eccentric thereto, said wedge member having a port therethrough and having a portion of the outer surface at one side of the port in the arc of a smaller circle than a portion of said surface at the opposite side of said port.

12. In combination a rotary valve, a valve casing therefor, a curved wedge member having the inner surface engaging with the valve and the outer surface eccentric thereto, said wedge member having a port therethrough and having a portion of the outer surface at one side of the port in the arc of a smaller circle than a portion of said surface at the opposite side of said port thereby determining the relative areas of the opposite surfaces of the port.

13. In combination a rotary valve, a valve casing, a curved wedge member having a port therethrough and a groove in the outer surface extending from said port toward the thicker edge of the wedge member, and a projection on said valve casing within said groove and of substantially the same cross sectional area as the latter.

14. In combination a rotary valve, a valve casing, a curved wedge member within said casing and having its inner surface engaging with said valve, said wedge member having a port therethrough and having the surface of the port nearest to the thicker edge of the wedge member not greater than the opposite surface of the port.

15. In combination a rotary valve, a valve casing, a curved wedge member within said casing and having its inner surface engaging with said valve, said wedge member having a port therethrough and having the surface of the port nearest to the thicker edge of the wedge member smaller than the opposite surface of the port.

16. In combination, a rotary valve, a valve casing, a curved wedge member within said casing and having its inner surface engaging with said valve and its outer surface eccentric to the valve, said wedge member having a port therethrough and having the portion of its outer surface on the side of the port nearer to the thicker edge of the wedge member in the arc of a smaller circle than the portion of the outer surface at the opposite side of said port.

17. In combination, a rotary valve, a valve casing, a curved wedge member within said casing and having its inner surface engaging with said valve and its outer surface eccentric to the valve, said wedge member having a port therethrough and having the portion of its outer surface on the side of the port nearer to the thicker edge of the wedge member in the arc of a smaller circle than the portion of the outer surface at the opposite side of said port, and said casing having a projection engaging with said portion of smaller arc.

18. An internal combustion engine having a cylinder provided with a single port, a valve casing having inlet and exhaust ports, a rotary valve for connecting said cylinder port with the other ports in succession, a curved wedge member between said cylinder and the valve and having a port therethrough registering with the cylinder port, said wedge member having its outer surface eccentric to the valve and provided with a groove extending from the port toward the thicker or base end of the wedge member and a projection in said casing of substantially the same cross sectional area as said groove, whereby the opposing exposed surfaces of the wedge member at its port effect a greater net pressure action of the gas toward the thinner edge of the wedge member than toward the thicker edge.

Signed at New York in the county of New York and State of New York this 27th day of December A. D. 1922.

RUDOLPH WEHR.